United States Patent
Butler et al.

(10) Patent No.: US 9,652,396 B2
(45) Date of Patent: May 16, 2017

(54) CACHE ELEMENT PROCESSING FOR ENERGY USE REDUCTION

(71) Applicant: SAMSUNG ELECTRONICS COMPANY, LTD., Suwon, Gyeonggi-Do (KR)

(72) Inventors: Michael G. Butler, San Jose, CA (US); Magnus Ekman, Alameda, CA (US)

(73) Assignee: Samsung Electronics Co., Ltd. (KR)

( * ) Notice: Subject to any disclaimer, the term of this patent is extended or adjusted under 35 U.S.C. 154(b) by 47 days.

(21) Appl. No.: 14/142,638

(22) Filed: Dec. 27, 2013

(65) Prior Publication Data

US 2015/0186284 A1    Jul. 2, 2015

(51) Int. Cl.
| | | |
|---|---|---|
| *G06F 12/08* | (2016.01) | |
| *G06F 12/0864* | (2016.01) | |
| *G06F 12/0853* | (2016.01) | |
| *G06F 12/0811* | (2016.01) | |
| *G06F 12/0855* | (2016.01) | |

(52) U.S. Cl.
CPC ...... *G06F 12/0864* (2013.01); *G06F 12/0853* (2013.01); *G06F 12/0811* (2013.01); *G06F 12/0857* (2013.01); *G06F 2212/1016* (2013.01); *G06F 2212/6032* (2013.04); *Y02B 60/1225* (2013.01)

(58) Field of Classification Search
CPC ............. G06F 12/0811; G06F 12/0853; G06F 12/0857; G06F 12/0864; G06F 2212/1016; G06F 2212/6032
See application file for complete search history.

(56) References Cited

U.S. PATENT DOCUMENTS

| | | | |
|---|---|---|---|
| 5,274,790 A | 12/1993 | Suzuki et al. | |
| 5,636,354 A * | 6/1997 | Lear | G06F 12/0864 711/140 |
| 5,737,569 A | 4/1998 | Nadir et al. | |
| 5,887,183 A | 3/1999 | Agarwal et al. | |
| 5,918,044 A | 6/1999 | Levitan et al. | |
| 6,557,078 B1 | 4/2003 | Mulla et al. | |
| 6,604,174 B1 * | 8/2003 | Dean | G06F 12/0844 711/118 |
| 6,931,489 B2 | 8/2005 | Delano et al. | |
| 7,299,311 B1 | 11/2007 | Sepeda et al. | |
| 7,937,535 B2 | 5/2011 | Ozer et al. | |
| 2003/0163643 A1 | 8/2003 | Riedlinger et al. | |
| 2007/0291044 A1 * | 12/2007 | Xu | G06T 15/04 345/582 |
| 2009/0031082 A1 * | 1/2009 | Ford | G06F 12/0864 711/128 |
| 2011/0078358 A1 | 3/2011 | Shebanow | |

(Continued)

OTHER PUBLICATIONS

Zhu, Z. et al., "A Novel Hierarchical Multi-port Cache", Proceedings of the 29th European Solid-State Circuits Conference (ESSCIRC'03), Sep. 16-18, 2003, pp. 405-408, IEEE, United States.

*Primary Examiner* — Yong Choe
(74) *Attorney, Agent, or Firm* — Innovation Counsel LLP (57) ABSTRACT

A method for accessing a cache memory structure includes dividing a multiple cache elements of a cache memory structure into multiple groups. A serial probing process of the multiple groups is performed. Upon a tag hit resulting from the serial probing process, the probing process for remaining groups exits.

26 Claims, 10 Drawing Sheets

(56) References Cited

U.S. PATENT DOCUMENTS

2012/0047329 A1 2/2012 Goel et al.
2013/0111141 A1 5/2013 Kessler et al.
2013/0179640 A1 7/2013 Aggarwal et al.

* cited by examiner

| Way | Utilization |
|---|---|
| 0 | 100% |
| 1 | 75% |
| 2 | 50% |
| 3 | 25% |

FIG. 9

| Way | Utilization from port A | Utilization from port B | Total utilization |
|---|---|---|---|
| 0 (1st copy) | 100% | 0% | 100% |
| 0 (2nd copy) | 0% | 100% | 100% |
| 1 | 75% | 25% | 100% |
| 2 | 50% | 50% | 100% |
| 3 | 25% | 75% | 100% |

FIG. 10

| Ways | Utilization from port A | Utilization from port B | Total utilization |
|---|---|---|---|
| 0-7 (1st copy) | 100% | 0% | 100% |
| 0-7 (2nd copy) | 0% | 100% | 100% |
| 8-15 | 75% | 25% | 100% |
| 16-23 | 50% | 50% | 100% |
| 24-31 | 25% | 75% | 100% |

CACHE ELEMENT PROCESSING FOR ENERGY USE REDUCTION

TECHNICAL FIELD

One or more embodiments generally relate to cache element processing and, in particular, to serially processing grouped cache elements for reducing energy.

BACKGROUND

Cache memory structures are used in computer systems by devices, such as central processing units (CPUs), graphical processing units (GPUs), etc. to reduce the average latency and/or reduce the bandwidth needs to main memory. Cache memory structures are commonly designed to provide a certain associativity, meaning that there are multiple alternate locations where a specific cache line may be placed. The associativity implies that multiple locations need to be searched when doing a cache tag look-up. In general, for an N-way associative cache, each look-up involves examining N tags. Each examination of the tags typically involves processing the tags in parallel by reading out the tag from a static random access memory (SRAM) and comparing it to the requested address. For highly associative caches, the processing power used for parallel look-ups may result in a significant energy use cost.

SUMMARY

One or more embodiments generally relate to grouping cache tags of a cache memory structure and serially processing the cache element groups for reduced processing power usage. In one embodiment, a method provides for accessing a cache memory structure includes dividing multiple cache elements of a cache memory structure into multiple groups. In one embodiment, a serial probing process of the multiple groups is performed. In one embodiment, upon a tag hit resulting from the serial probing process, the probing process exits without performing processing for the remaining groups (e.g., exits from performing look-ups).

In one embodiment a non-transitory computer-readable medium having instructions which when executed on a computer perform a method comprising dividing a plurality of cache elements of a cache memory structure into multiple groups. In one embodiment, a serial probing process of the multiple groups is performed. In one embodiment, upon a tag hit resulting from the serial probing process, the probing process for remaining groups is exited.

In one embodiment, a graphics processor for an electronic device comprises: one or more processing elements coupled to a hierarchy of memory devices. In one embodiment, the graphics processor processes a cache memory structure of the hierarchy of memory devices by dividing a plurality of cache elements of the cache memory structure into multiple groups, serial probing the multiple groups, and upon a tag hit resulting from the serial probing, exiting the serial probing for any remaining groups.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for a reduction of the number of tag look-ups and the associated power cost by providing serial-based cache element look-up processing. In one or more embodiments, cache elements (e.g., one or more of tags and data) are divided into groups and the groups are probed serially, as compared to parallel tag look-ups as with conventional cache processing. In one embodiment, to support multi-ported cache accessing, the different ports probe the different tag groups in different order.

In one embodiment, a method provides for accessing a cache memory structure includes dividing multiple cache elements of a cache memory structure into multiple groups. In one embodiment, a serial probing process of the multiple groups is performed. In one embodiment, upon a tag hit resulting from the serial probing process, the probing process for one or more remaining groups exits.

Figure 1:
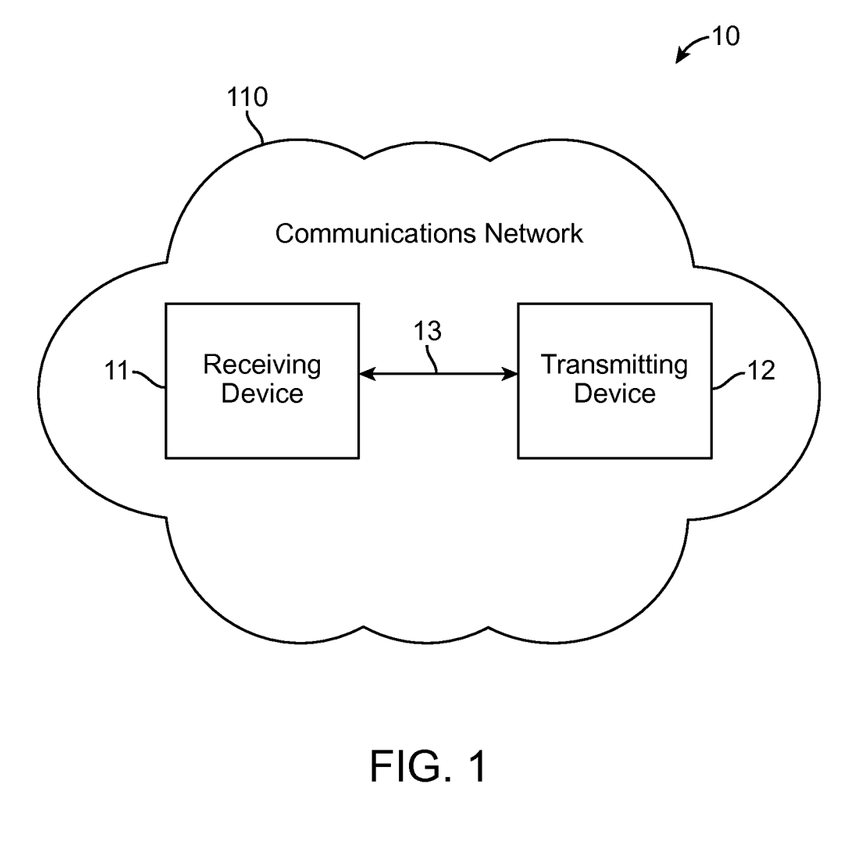
FIG. 1 shows a schematic view of a communications system, according to an embodiment.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
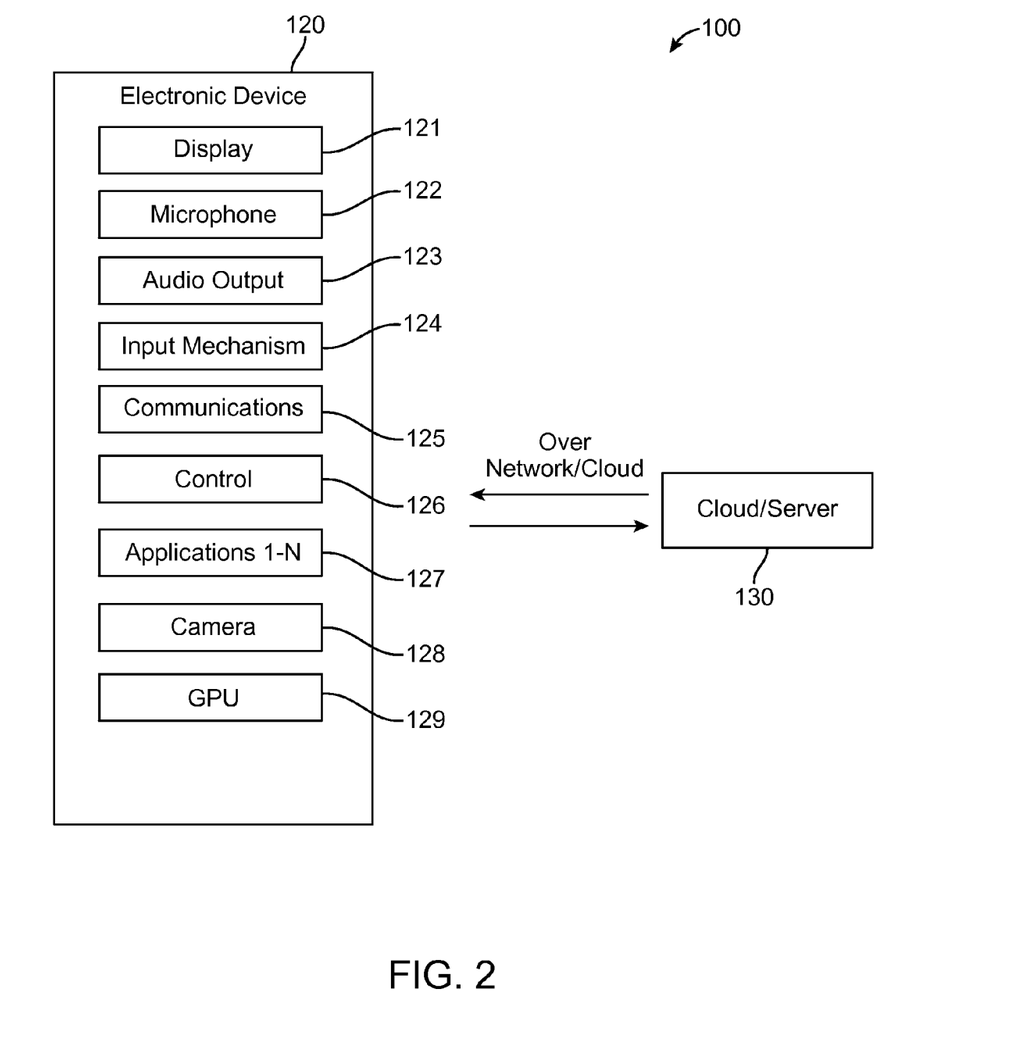
FIG. 2 shows a block diagram of architecture for a system including a mobile device including a graphical processing unit (GPU) module, according to an embodiment.

FIG. 2 shows a functional block diagram of an architecture system 100 that may be used for cache processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a GPU module 129, and any other suitable components. In one embodiment, the electronic device 120 further comprises a CPU that may also use one or more embodiments for serial processing one or more cache memory structures. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc., photos/videos, etc.

In one embodiment, the GPU module 129 comprises processes and/or programs for processing images and portions of images for rendering on the display 121 (e.g., 2D or 3D images). In one or more embodiments, the GPU module may comprise GPU hardware and memory (e.g., a memory hierarchy 300 (FIG. 3), SRAM, DRAM, processing elements, multi-ported cache structures, texture cache, shader cache, etc.).

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
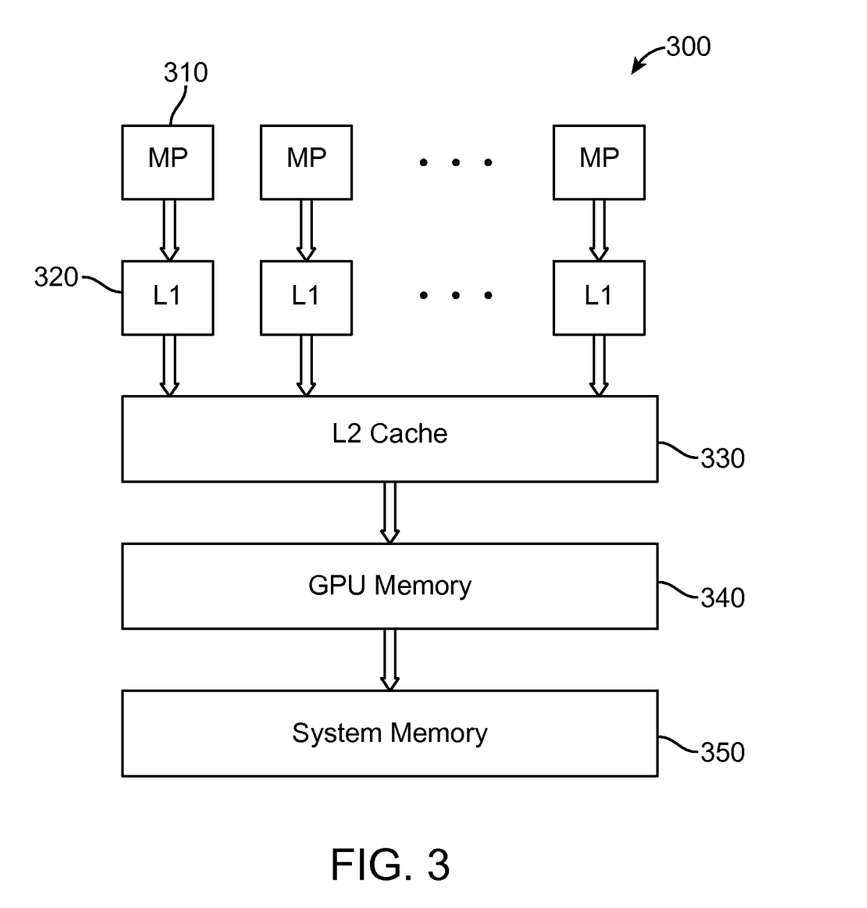
FIG. 3 shows an example memory hierarchy with multiple physical storage devices.

FIG. 3 shows an example memory hierarchy structure 300 that may be used in one or more embodiments. In one example embodiment, the memory hierarchy 300 comprises system memory 350 (e.g., RAM, SDRAM, SRAM, DRAM, etc.), GPU memory 340, L2 cache memory 330, L1 cache memory 320 and multiprocessors (MP) 310 (e.g., 4 MPs, 8 MPs, 16 MPs, etc.). In other embodiments, other cache structures, such as L3 cache, may be added and would be further away from the MPs 310 than the L2 cache 330 structure(s).

In one embodiment, the GPU memory 340 may be on-board with a GPU or be on a separate memory structure that the GPU may access. In one embodiment, a GPU of the GPU module 129 (FIG. 2) may have less GPU memory 340 than the system memory 350, but the memory bandwidth for the GPU(s) may be substantially higher than that of a CPU(s). In one example embodiment, as with GPU memory 340, the GPU's L2 cache 330 may be much smaller than a typical CPU's L2 or L3 cache, but has much higher bandwidth available.

In one embodiment, the L1 cache 320 onboard a GPU may be smaller than L1 cache in a CPU, but the L1 cache 320 may have a much higher bandwidth. In one embodiment, the MPs 310 may comprise streaming MPs that are each equipped with its own L1 cache 320. In one embodiment, the GPU of GPU module 129 includes physical memory structures, for example: a primitive mapping table (PMT), a plane equation table (PEQ), a texture cache (T$), a graphics state table (GST), thread descriptor queues (TDQ), a first level (L1) data cache (L1D$), a register file (RF), a first level (L1) instruction cache (L1I$), a first level (L1) constant cache (L1C$), etc.

Figure 4:
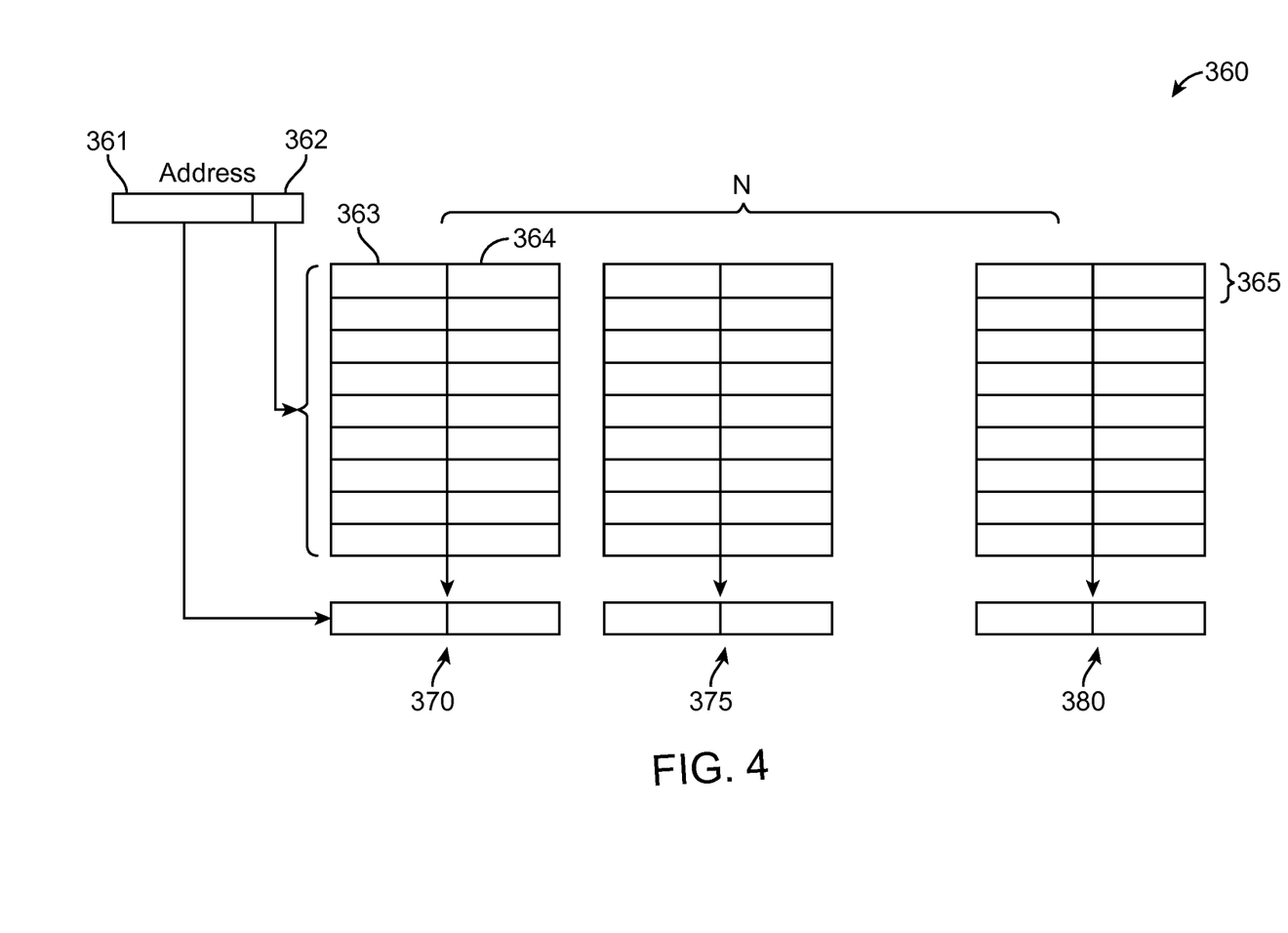
FIG. 4 shows an example cache memory structure that may be used by one or more embodiments.

FIG. 4 shows an example cache memory structure 360 that may be used by one or more embodiments. In one embodiment, the cache structure 360 comprises of an N way (associative) cache structure, where N is an integer greater than 0 (e.g., 4, 8, 32, 64, etc.). Therefore, there are N ways to store each cacheline. The cacheline address includes bits 361 for compare bits or tags (e.g., multiple bits, such as 4, 8, etc.) and a set select bits or index to select a particular set in the cache, field 362 may include byte select bits to select a particular byte in the accessed block. In one example, the ways 370, 375 to 380 include cache lines 365 that include a tag 363 and data 364. In one example, a tag look-up or compare input includes a targeted tag and tag index 361. As shown, the cache lines 365 include 2 entries (tags and data) for N lines.

Figure 5:
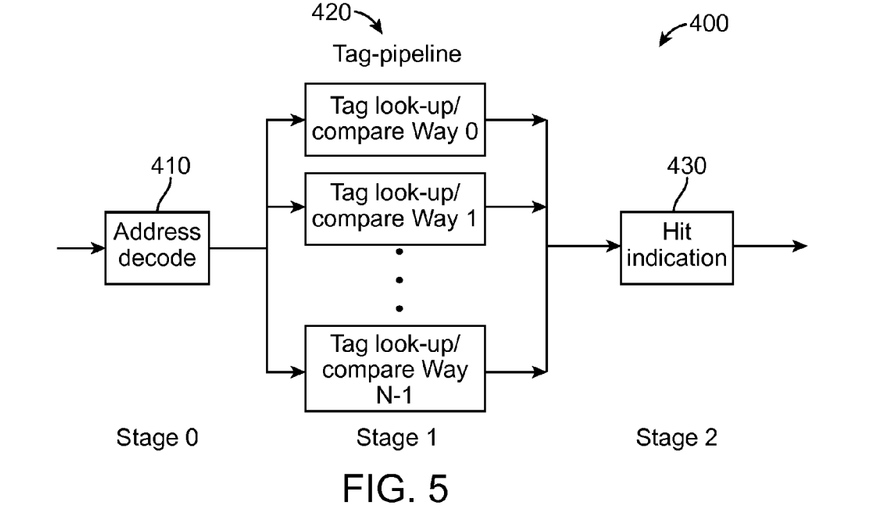
FIG. 5 shows an example parallel cache tag look-up pipeline.

FIG. 5 shows an example parallel cache tag look-up pipeline 400. In the example process 400, stage 0 includes address decode 410, stage 1 includes a traditional tag-pipeline 420 with parallel look-ups of all cache ways 0 to N−1, and stage 2 of a possible hit indication 430. In process 400, each way of the N ways has a tag look-up performed in parallel with the other ways, regardless when a hit (i.e., a targeted tag was found) occurs.

Figure 6:
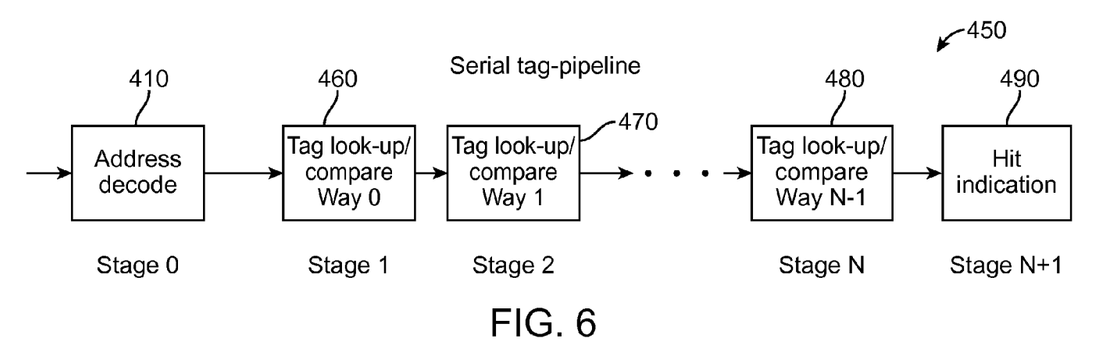
FIG. 6 shows an example serial processing pipeline for cache tag look-ups, according to an embodiment.

FIG. 6 shows an example serial processing pipeline 450 for cache tag look-ups, according to an embodiment. In one example embodiment, the group size N/M shown in the serial processing pipeline 450 is equal to 1 (i.e., M=1). In one or more embodiments, an example uses a process (e.g., performed by a GPU, CPU, or processing element (e.g., shader processing element, texture processing element, etc.)) where if a cache line (e.g., cache line 365, FIG. 4) is present in an N-way associative cache, then on average it may be found performing a tag look-up after probing/examining only N/2 of the ways (assuming that the tags 363 are examined in a random order). In one example embodiment, the serial processing pipeline 450 includes multiple stages in series (i.e., Stage 0 460, Stage 1 470 . . . Stage N 480) for tag look-ups, and Stage N+1 490 for a hit indication.

In one embodiment, the tags 363 are divided into M groups (each group consisting of N/M ways, where M is between 1 and N) and then perform the tag-look-up serially, group-by-group, and if the cache line is found, no more tag-look-ups are needed (i.e., the cache tag look-up exits without further look-ups being made, which is herein referred to as "early out"). In one embodiment, the grouping comprises grouping cache elements, such as tags and data, or data. In one embodiment, performing the tag look-up serially increases the worst case look-up latency by a factor of M. In one embodiment, the group size may be determined based on physical (e.g., memory size or available memory building block (e.g., a SRAM array, etc.)) and logical characteristics (e.g., partitions available, etc.) of the cache memory structure.

In one embodiment, while the average latency for a tag look-up increases, the throughput of the cache tag structure is not reduced. In one example embodiment, sub-sequent tag look-ups co-exist in the serial processing pipeline 450, i.e. if taglook-up request A is in Stage 2 470 of the serial processing pipeline 450, a sub-sequent request B will be in Stage 1 460 of the serial processing pipeline 450. It should be noted that the serial processing pipeline 450 does not show the "early out" functionality, which basically results in subsequent stages of the pipeline being disabled and bypassed upon a tag hit occurring in the probing tag look-up process of the serial processing pipeline 450 (e.g., the process jumps to Stage N+1 490 then exits, or the pipeline 450 continues to run at the full latency but the unnecessary groups lookups are suppressed to save energy). In one embodiment, stage 490 will still be reached at the same number of cycles after the initial group lookup, but the energy will still be saved.

In one embodiment, when factoring in the "early out" functionality, the serial processing pipeline 450 may be viewed as having dynamic latency where the latency is shorter the sooner a tag hit is discovered.

In one embodiment, the cache elements 9 (e.g., tags, data, tags and data, etc.) are accessed serially group-by-group in an order, such as a selected order, a predefined order, etc. In one example embodiment, the order may be a forward order (G0, G1, G2 . . . GN−1), reverse order (GN−1 . . . G2, G1, G0) random order, pseudo-random order (e.g., partially random order, predetermined order that is scattered to seem random (e.g., G0, G5, G2, G4, G3, etc.), but is repeatable), etc., where G stands for group.

Figure 7:
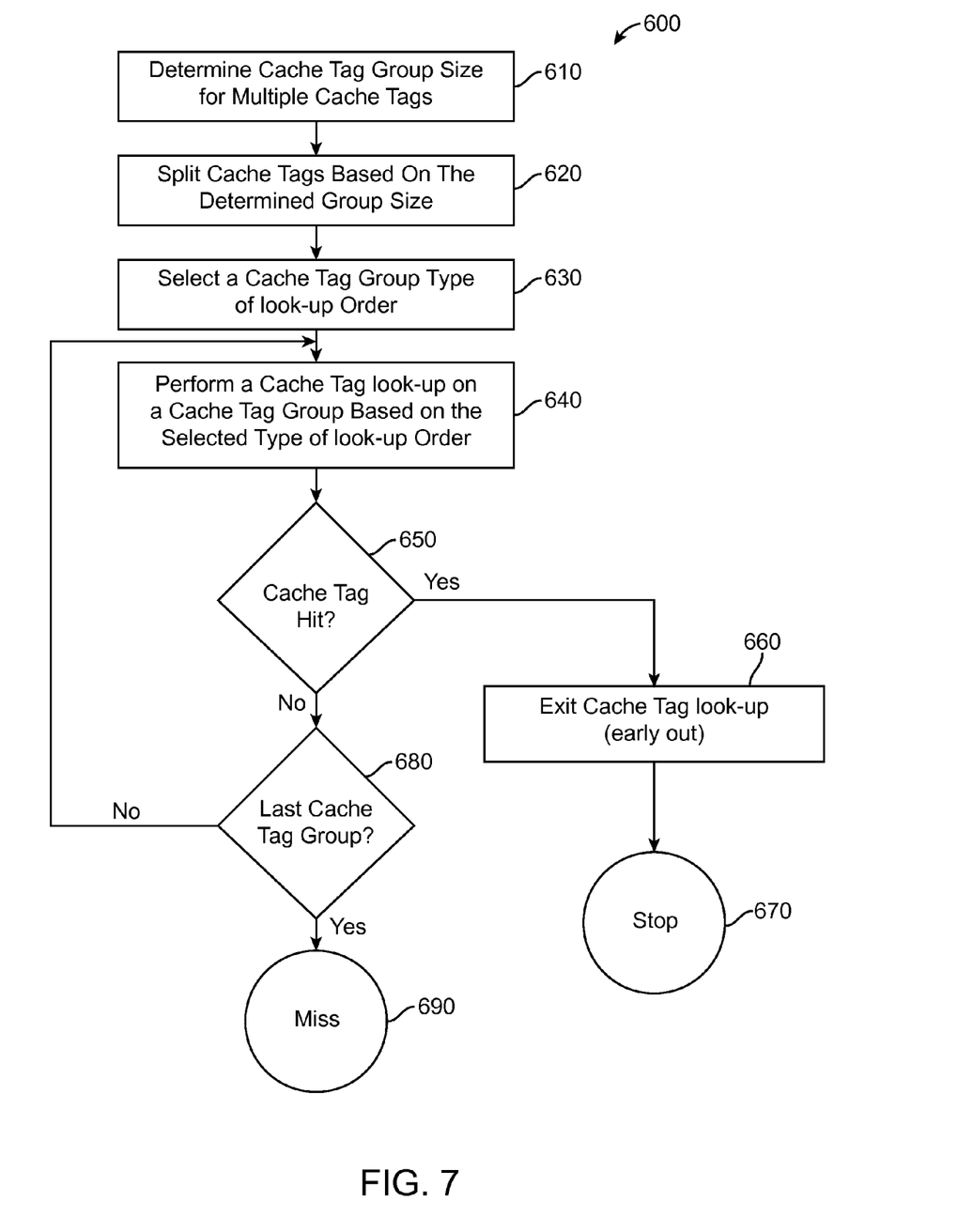
FIG. 7 shows an example process for serial cache tag group look-ups with an early exit, according to an embodiment.

FIG. 7 shows an example flow diagram for process 600 for serial cache tag group look-ups with an early exit, according to an embodiment. In one embodiment, in block 610 a cache tag group size for multiple cache tags is determined (e.g., based on the physical and/or logical constraints of a cache memory structure (e.g., L1, L2, etc., cache structures) used by a GPU or CPU). In one embodiment, in block 620 once the number of cache tag groups M is determined, the cache tags are split into the groups based on the determined group size N/M. In one embodiment, the cache tag groups may be logically arranged into the groups based on the determined group size N/M, or the look-ups are performed based on searching a specified order of cache tags in the cache memory structure based on address, etc. such that the cache tags are looked-up by group and not by each way 0 to N−1.

In one embodiment, in block 630 a cache tag group type of look-up order (e.g., forward, random, pseudo-random, reverse, etc.) may be selected, designated or automatically/dynamically be assigned or may be fixed by the GPU or CPU. In one embodiment, the selected or assigned order may change or remain the same from one pass to determine a cache hit or miss to the next. In one embodiment, the different types of selected order for the cache tag look-ups may be tracked and selected based on heuristics.

In one embodiment, in block 640 a cache tag look-up is performed on a cache tag group based on the selected, assigned or fixed type of order. In block 650 it is determined whether a cache tag hit has occurred or not. In one embodiment, if a cache tag hit has occurred in the group that is processed, process 600 continues to block 660 where an "early out" exits the process 600 based on the cache tag hit, and the current process 600 stops at block 670. In one embodiment, if a cache tag hit did not occur in block 650, process 600 continues to block 680.

In one embodiment, in block 680 it is determined whether the group just processed is the last cache tag group or not. In one embodiment, if it is determined that the processed group was the last cache tag group, and then process 600 continues to block 690 where a cache miss is the result and the process 600 exits. In one embodiment, if it is determined in block 680 that the group just processed is not the last cache tag group remaining, then process 600 continues to block 640 with the next group to be processed based on the group order selected, assigned, designated, etc.

Figure 8:
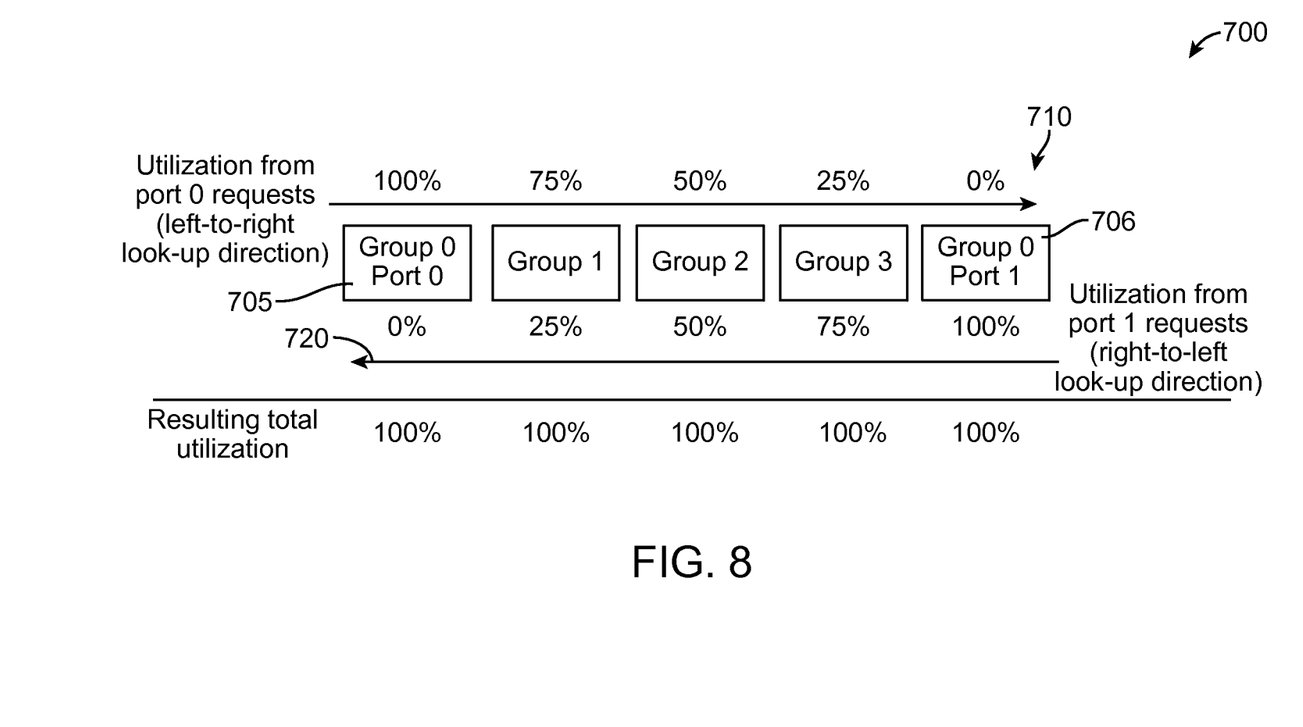
FIG. 8 shows an example cache tag process flow for a cache tag structure with multiple ports, according to an embodiment.

FIG. 8 shows an example cache tag process flow 700 for a cache tag structure with multiple ports, according to an embodiment. In many cases, multiple GPU or CPU agents/elements/processes, etc. may need to access a single cache structure. In order to provide simultaneous accesses to the multiple agents/elements/processes (e.g., to provide high bandwidth) it is necessary to build a cache tag structure with multiple ports. One or more embodiments may use different techniques for having a cache structure with multiple ports. Some examples include one or more of the following (either separate or in combination). One technique is to use multi-ported SRAM cells, which may be expensive from device area (e.g., chip, foot print, etc.) and/or energy standpoint. Another technique is to divide the cache tags into multiple banks and select a bank based on address. For example, if two requests do not map to the same bank, then both may be serviced simultaneously, which may have a problem in that conflicts will typically occur unless the tag structure is heavily banked (which leads to inefficiencies). Another technique is to duplicate the tag and optionally the data structures so that the multiple ports have dedicated SRAM structures to access. One problem that may occur with this is that it is costly from a device area standpoint.

In one embodiment, the process flow 700 shows multiple tag groups for port 0 705 and port 1 706. In one embodiment, the port 0 requests proceed from left-to-right (i.e., in a first or forward order), and the port 1 requests proceed from the right-to-left (i.e., in a second or reverse/opposite order from the first order). In one embodiment, the percentages 710 depicted show the utilization for the look-up process moving from group-to-group serially from the port 0 705 accesses, while the percentages 720 depicted show the utilization for the look-up process moving from group-to-group serially from the port 1 706 accesses. In one embodiment, while the order for the port 0 705 access is shown in a serial forward order, the above-mentioned orders (e.g., random, pseudo-random, etc.) may also be used as well.

Figure 9:
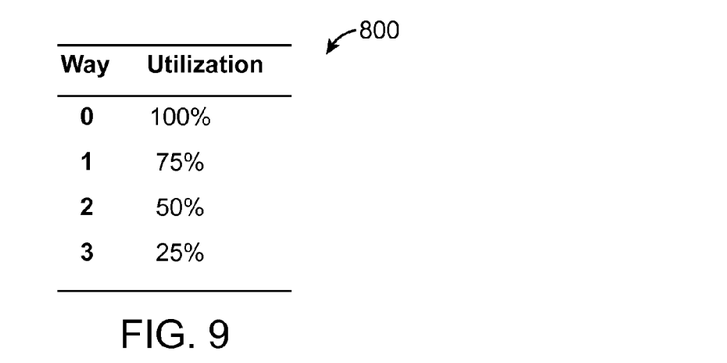
FIG. 9 shows an example utilization of different ways for a serially accessed cache tag structure, according to an embodiment.

FIG. 9 shows an example utilization 800 of different ways for a serially accessed cache tag structure, according to an embodiment. In one embodiment, the serially accessed cache with "early out" presents an improvement over the duplication technique (i.e., duplicating the tag structures so that the multiple ports have dedicated SRAM structures to access). In one embodiment, N−1=3, and the example utilization 800 is based on the insight that the access frequency for the different way-structures is not uniform in a serially accessed cache. In one example embodiment, the example utilization is based on a 4-way associative serially accessed cache with "early out" and a negligible miss rate. In one example embodiment, the group size N/M is set to 1. It may be seen that after one group is processed, if an "early out" occurs (i.e., a cache tag hit for the first group), the utilization is 100%, and decreases since subsequent groups need not be interrogated and thus their utilization drops by the probability of a prior hit.

Figure 10:
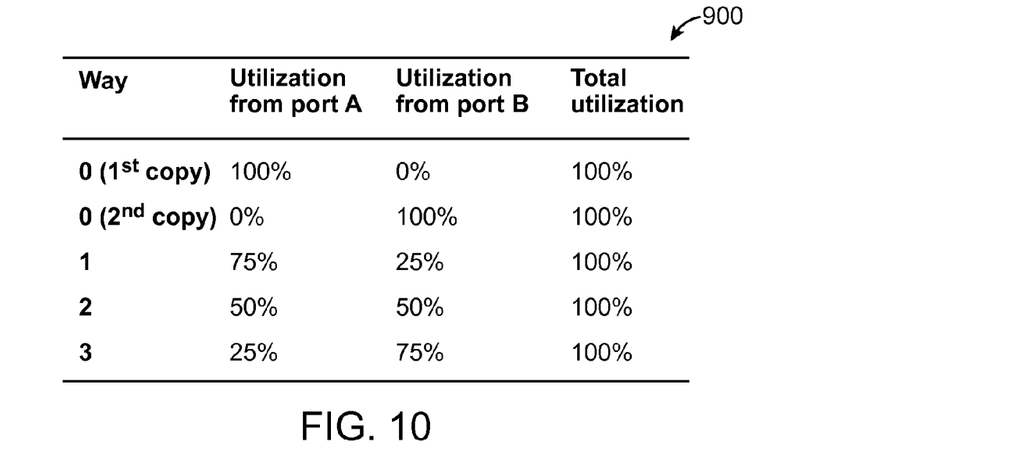
FIG. 10 shows an example utilization of different ways for a serially accessed cache tag structure with multiple ports, according to an embodiment.

FIG. 10 shows an example utilization 900 of different ways for a serially accessed cache tag structure with multiple ports, according to an embodiment. In one example embodiment, N=4, and all requests perform a look-up in way 0, but since 25% of the requests will hit in that way, only 75% of the requests will perform a look-up in way 1, and so on. It should be noted that 25% is assuming a uniform access distribution and random placement. In one example embodiment, temporal access locality is exploited by preferentially placing data that is expected to be used frequently (e.g., based on an access history table) in one of the ways/groups that are examined first. In one example embodiment, a second port is added to the tag structure. In one embodiment, the second port may be done by providing another physical copy of way or group 0, and then let the other port access the rest of the tags in reverse order (e.g., way/group 0, way/group 3, way/group 2, way/group 1).

Figure 11:
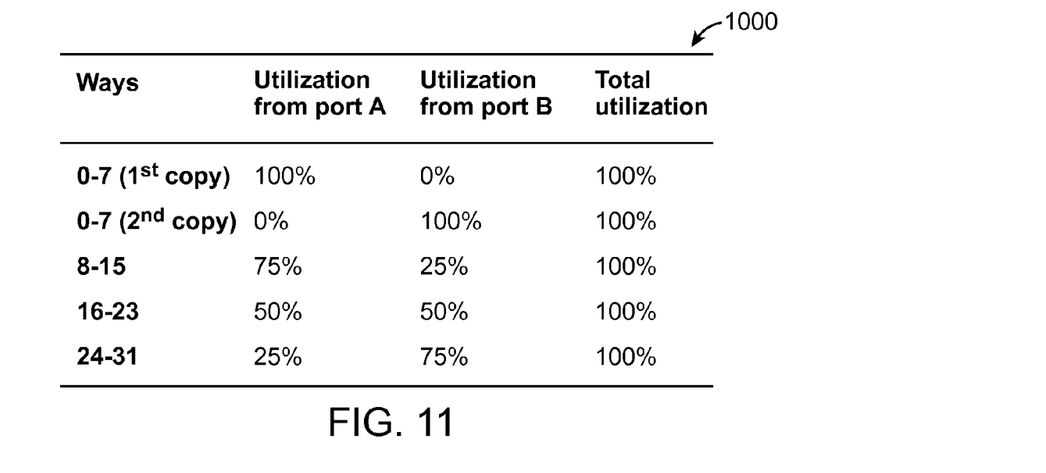
FIG. 11 shows an example utilization of thirty-two (32) different ways for a cache with four (4) groups that is serially accessed, according to an embodiment.

FIG. 11 shows an example utilization 1000 of thirty-two (32) different ways for a cache with four (4) groups that is serially accessed, according to an embodiment. In one example embodiment, two ports are used for accessing the example cache memory structure. In one example, for the utilization 1000, the second port may be added by increasing area by 25% (e.g., another copy of way/group 0) instead of increasing the area by 100% (e.g., another copy of all ways/groups). In one example embodiment, the same technique may be used for a serially accessed tag design where the group size N/M is larger than 1.

In one example embodiment, the utilization 1000 shows for a design of a 32-way associative cache with a group size M of 8. In one example, all of these utilization percentages are expected averages based on a number of assumptions. In one embodiment, utilizations may occur so the throughput is limited by the group that experiences the highest utilization. In one embodiment, there is no requirement that the way and group configuration results in a system with an expected utilization of 100% of each group.

Figure 12:
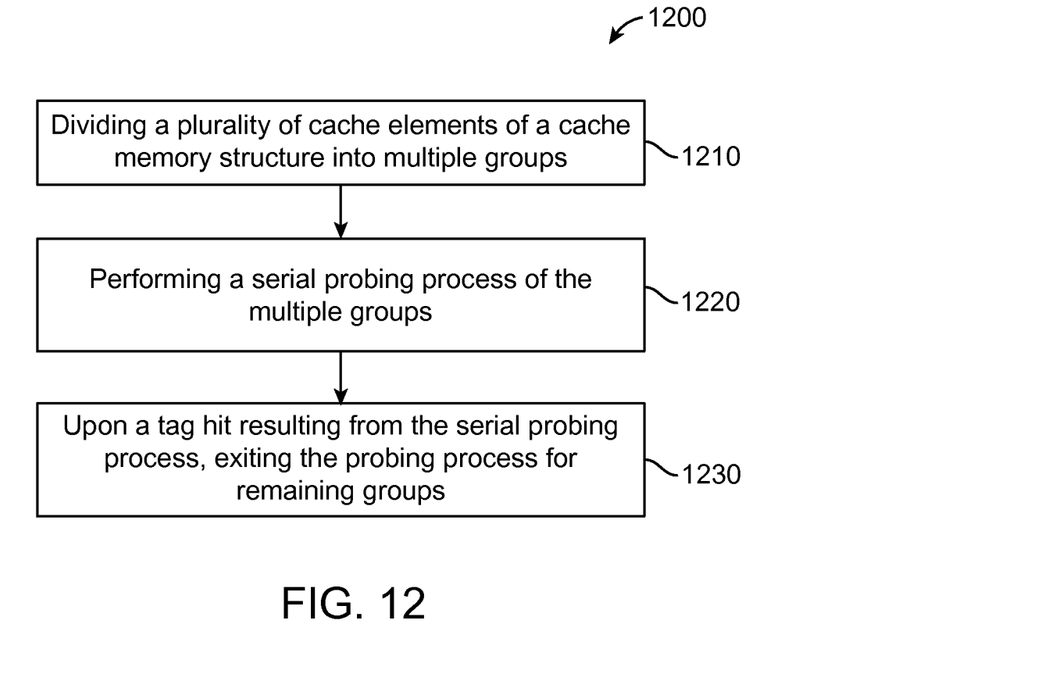
FIG. 12 shows a block diagram for a process for serially processing cache element groups, according to one embodiment.

FIG. 12 shows a block diagram for a process 1200 for accessing a cache memory structure using serial look-up of grouped cache elements, according to one embodiment. In one embodiment, in block 1210 multiple cache elements (e.g., tags 363, FIG. 4, data, tags and data, etc.) of a cache memory structure (e.g., cache structure 360) into multiple groups M (e.g., M is greater or equal to one). In one embodiment, the cache structure may comprise a cache structure used by a CPU or GPU (e.g., a first level instruction cache, a first level data cache, a first level constant cache, a texture cache, a second level cache, etc.).

In one embodiment, in block 1220 a serial probing process (e.g., cache tag look-up or compare) of the multiple groups is performed (e.g., by a processing element, agent, CPU, GPU, etc.). In one embodiment, in block 1230 upon a tag hit resulting from the serial probing process, the probing process exits for remaining groups (e.g., an "early exit" is performed).

In one embodiment, process 1200 determines a group size for the plurality of cache tags based on physical and logical characteristics of the cache memory structure. In one example embodiment, in process 1200 the multiple cache elements are accessed serially group-by-group in a predefined order (e.g., forward, reverse, random, pseudo-random, etc.).

In one embodiment, in process 1200 a first port is provided to the cache memory structure, and the first port accesses the multiple groups in a first order (e.g., a forward order, a reverse order, etc.). In one embodiment, in process 1200 a second port is provided to the cache memory structure, and the second port accesses the multiple groups in a second order (e.g., forward order, reverse order, etc.). In one embodiment, in process 1200 the first order and the second order are different from one another (e.g., one is forward, the other is reverse, one is random, the other is pseudo-random, one is opposite random, etc.).

In one embodiment, in process 1200 a duplicate copy of one or more of the multiple groups are provided. In one embodiment, the first port and the second port access particular one or more of the multiple groups that do not have duplicate copies in a reverse order from one another. In one embodiment, multiple ports (e.g., 2, 4, etc.) are provided to the cache memory structure, and the multiple ports access the multiple groups in a different order from each other.

In one embodiment, the cache memory structure is part of a GPU (e.g., a GPU of the GPU module 129, FIG. 2) of an electronic device (e.g., electronic device 120, FIG. 2). In another embodiment, the cache memory structure of process 1200 is part of a CPU of an electronic device.

Figure 13:
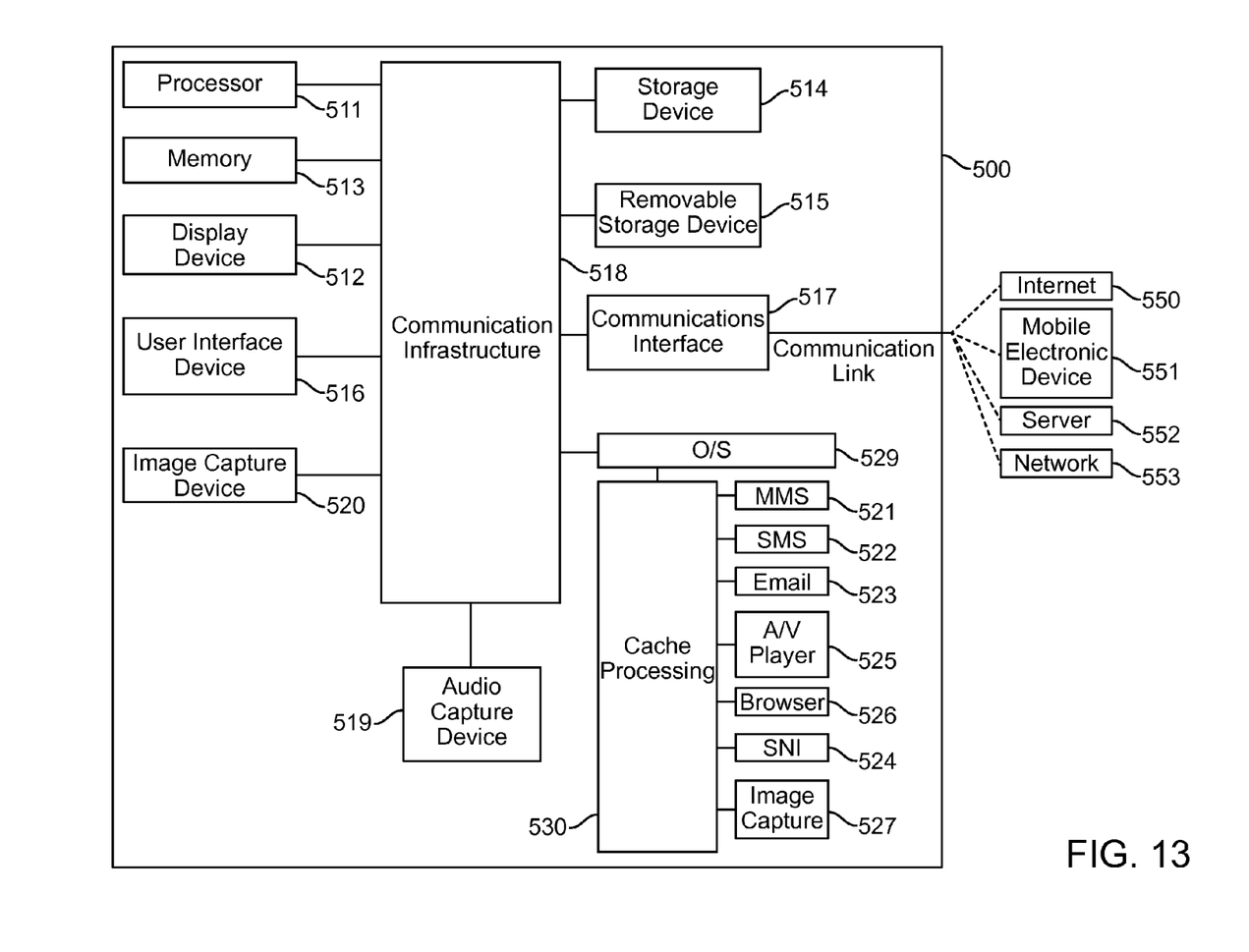
FIG. 13 is a high-level block diagram showing an information processing system comprising a computing system implementing one or more embodiments.

FIG. 13 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a cache processing module 530 that may implement processing similar as described regarding the cache structure 360 (FIG. 4) by a serial cache process pipeline 450 (FIG. 6) or 700 (FIG. 8). In one embodiment, the cache processing module 530 may implement the process of flowchart 600 (FIG. 7) or process 1200 (FIG. 12). In one embodiment, the cache processing module 530 along with an operating system 529 may be implemented as executable code residing in a memory of the system 500. In another embodiment, the cache processing module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for accessing a cache memory structure comprising:
    performing a serial probing process comprising serially accessing a plurality of grouped cache elements of a cache memory structure group-by-group, wherein the plurality of grouped cache elements comprises tags, the plurality of grouped cached elements grouped into multiple cache tag group types based on the tags, the cache memory structure comprises a first port, and the first port is configured to access the plurality of grouped cache elements in a first order selected from different orderings of the multiple cache tag group types; and
    upon a tag hit resulting from the serial probing process, exiting the serial probing process for one or more remaining grouped cache elements of the cache memory structure.

2. The method of claim 1, wherein the plurality of grouped cache elements further comprises data.

3. The method of claim 2, wherein the first order comprises one of a random order of the multiple cache tag group types and a pseudo-random order of the multiple cache tag group types.

4. The method of claim 2, wherein the cache memory structure comprises a second port, and the serially accessing the plurality of grouped cache elements of the cache memory structure group-by-group comprises:

accessing, by the first port, the plurality of grouped cache elements in the first order; and accessing, by the second port, the plurality of grouped cache elements in a second order selected from the different orderings of the multiple cache tag group types.

5. The method of claim 4, wherein the first order and the second order are different from one another.

6. The method of claim 5, wherein the first order is a reverse of the second order.

7. The method of claim 4, further comprising:

providing a duplicate copy of one or more of the plurality of grouped cache elements.

8. The method of claim 7, wherein the first port and the second port access at least one of the plurality of grouped cache elements that do not have duplicate copies in a reverse order from one another.

9. The method of claim 2, further comprising:

accessing, via a plurality of ports of the cache memory structure, the plurality of grouped cache elements, wherein each port of the plurality of ports accesses the plurality of grouped cache elements in a different order from another port of the plurality of ports.

10. The method of claim 1, wherein the cache memory structure is part of a graphics processing unit (GPU) of an electronic device.

11. The method of claim 10, wherein the electronic device is a mobile electronic device.

12. A non-transitory processor-readable medium that includes a program that when executed by a processor performs a method comprising:

performing a serial probing process comprising serially accessing a plurality of grouped cache elements of a cache memory structure group-by-group, wherein the plurality of grouped cache elements comprises tags, the plurality of grouped cached elements grouped into multiple cache tag group types based on the tags, the cache memory structure comprises a first port, and the first port is configured to access the plurality of grouped cache elements in a first order selected from different orderings of the multiple cache tag group types; and upon a tag hit resulting from the serial probing process, exiting the serial probing process for one or more remaining grouped cache elements of the cache memory structure.

13. The non-transitory processor-readable medium of claim 12, wherein the plurality of grouped cache elements further comprises data.

14. The non-transitory processor-readable medium of claim 13, wherein the first order comprises one of a random order of the multiple cache tag group types and a pseudo-random order of the multiple cache tag group types.

15. The non-transitory processor-readable medium of claim 13, wherein the cache memory structure comprises a second port, and the serially accessing the plurality of grouped cache elements of the cache memory structure group-by-group comprises:

accessing, by the first port, the plurality of grouped cache elements in the first order; and accessing, by the second port, the plurality of grouped cache elements in a second order selected from the different orderings of the multiple cache tag group types.

16. The non-transitory processor-readable medium of claim 15, wherein the first order and the second order are different from one another.

17. The non-transitory processor-readable medium of claim 15, wherein the second order is a reverse of the first order.

18. The non-transitory processor-readable medium of claim 12, the method further comprising:

providing a duplicate copy of at least one of the plurality of grouped cache elements.

19. The non-transitory processor-readable medium of claim 18, wherein the first port and the second port access at least one of the plurality of grouped cache elements that do not have duplicate copies in a reverse order from one another.

20. The non-transitory processor-readable medium of claim 12, the method further comprising:

accessing, via a plurality of ports of the cache memory structure, the plurality of grouped cache elements, wherein each port of the plurality of ports accesses the plurality of grouped cache elements in a different order from another port of the plurality of ports.

21. The non-transitory processor-readable medium of claim 12, wherein the cache memory structure is part of a graphics processing unit (GPU) of an electronic device.

22. A graphics processor for an electronic device comprising:

a hierarchy of memory devices comprising a cache memory structure; and at least one processing element configured to serial probe a plurality of grouped cache elements of the cache memory structure group-by-group, and upon a tag hit resulting from the serial probe, to exit the serial probe for one or more remaining grouped cache elements of the cache memory structure, wherein the plurality of grouped cache elements comprises tags, the plurality of grouped cached elements grouped into multiple cache tag group types based on the tags, the cache memory structure comprises a first port, and the first port is configured to access the plurality of grouped cache elements in a first order selected from different orderings of the multiple cache tag group types.

23. The graphics processor of claim 22, wherein the plurality of grouped cache elements further comprises data.

24. The graphics processor of claim 22, wherein the first order comprises one of a random order of the multiple cache tag group types and a pseudo-random order of the multiple cache tag group types.

25. The graphics processor of claim 23, wherein the at least one processing element is configured to access, via a plurality of ports of the cache memory structure, the plurality of grouped cache elements, wherein each port of the plurality of ports accesses the plurality of grouped cache elements in a different order from another port of the plurality of ports.

26. The graphics processor of claim 25, wherein the at least one processing element is configured to provide a duplicate copy of at least one of the plurality of grouped cache elements, and the at least one processing element is configured to use the first port and a second port of the plurality of ports to access a at least one of the plurality of grouped cache elements that do not have duplicate copies in a reverse order from one another.

* * * * *